United States Patent
Feil et al.

(10) Patent No.: US 7,865,220 B2
(45) Date of Patent: Jan. 4, 2011

(54) PORTABLE ELECTRONIC APPLIANCE WITH A CAMERA AND AN OPTICAL DEFLECTION DEVICE

(75) Inventors: Henry Feil, München (DE); Ewald Frensch, Kissing (DE)

(73) Assignee: Gigaset Communications GmbH, Munich (DE)

( * ) Notice: Subject to any disclaimer, the term of this patent is extended or adjusted under 35 U.S.C. 154(b) by 776 days.

(21) Appl. No.: 11/885,964

(22) PCT Filed: Mar. 6, 2006

(86) PCT No.: PCT/EP2006/060490
§ 371 (c)(1), (2), (4) Date: Sep. 10, 2007

(87) PCT Pub. No.: WO2006/094964
PCT Pub. Date: Sep. 14, 2006

(65) Prior Publication Data
US 2008/0171571 A1    Jul. 17, 2008

(30) Foreign Application Priority Data
Mar. 9, 2005 (DE) .................... 10 2005 010 920

(51) Int. Cl.
*H04M 1/00* (2006.01)

(52) U.S. Cl. .............. 455/575.4; 455/575.1; 455/575.3; 455/566; 379/433.11; 379/433.12; 379/433.13; 348/14.01; 348/14.02; 348/373

(58) Field of Classification Search ............. 455/575.4, 455/575.3, 575.1, 566; 379/433.11, 433.12, 379/433.13; 348/14.01, 14.02, 373
See application file for complete search history.

(56) References Cited

U.S. PATENT DOCUMENTS

| | | | |
|---|---|---|---|
| 7,106,357 B2 * | 9/2006 | Fukuda et al. ........... | 348/14.02 |
| 7,710,495 B2 * | 5/2010 | Brunstrom et al. .......... | 348/373 |
| 2002/0067924 A1 * | 6/2002 | Yamazaki et al. .......... | 396/429 |
| 2003/0036365 A1 * | 2/2003 | Kuroda ....................... | 455/90 |
| 2004/0116166 A1 * | 6/2004 | Makishima ............... | 455/575.1 |
| 2005/0124394 A1 * | 6/2005 | Kim et al. ................. | 455/575.3 |

FOREIGN PATENT DOCUMENTS

WO    WO 2004/030345 A1    4/2004

* cited by examiner

*Primary Examiner*—Edward Urban
*Assistant Examiner*—Junpeng Chen
(74) *Attorney, Agent, or Firm*—Staas & Halsey LLP

(57) ABSTRACT

A portable electronic device is configured in particular as a mobile telephone having a first housing element with a second side. A linking device links the housing elements in such a way that they are movable in relation to each other, the first side facing the second side in at least one first state. A camera for acquiring images is arranged on the first side in such a way that it faces away from the first housing element. Moreover, an optical deflection device is arranged on the second side in such a way that it reflects back light impinging upon the second side. In the first state, the camera is arranged in relation to the optical deflection device in such a way that it receives light via the optical deflection device, while a second state the camera is moved away from the optical deflection device in such a way that it receives light which has not been deflected by the optical deflection device.

15 Claims, 2 Drawing Sheets

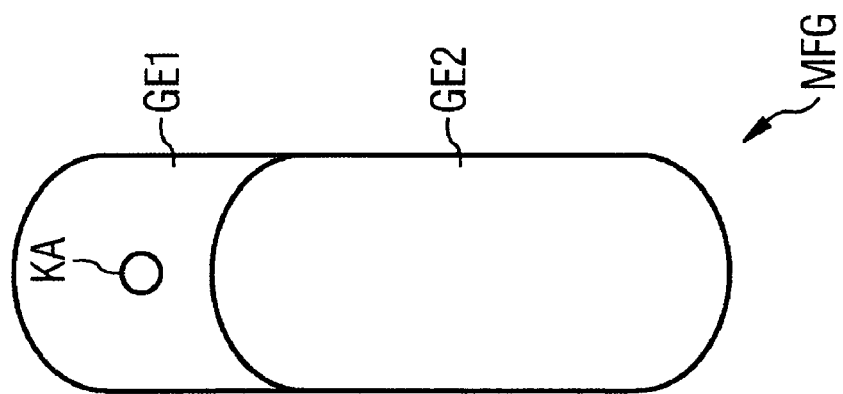
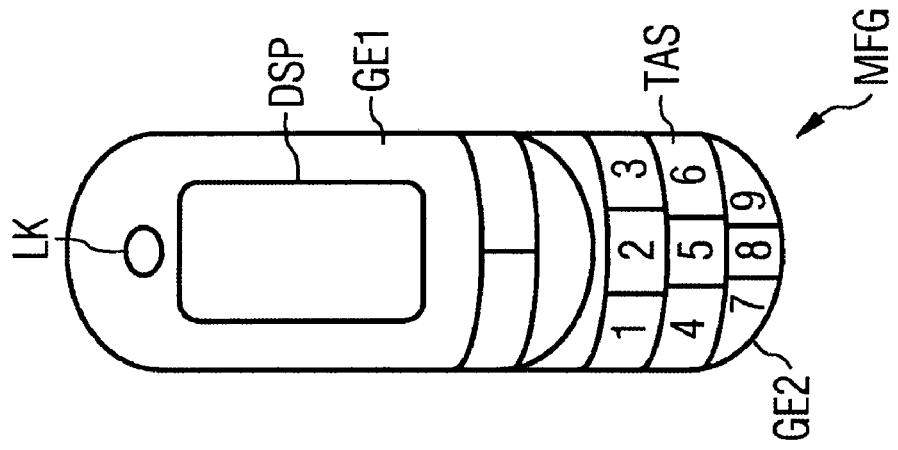
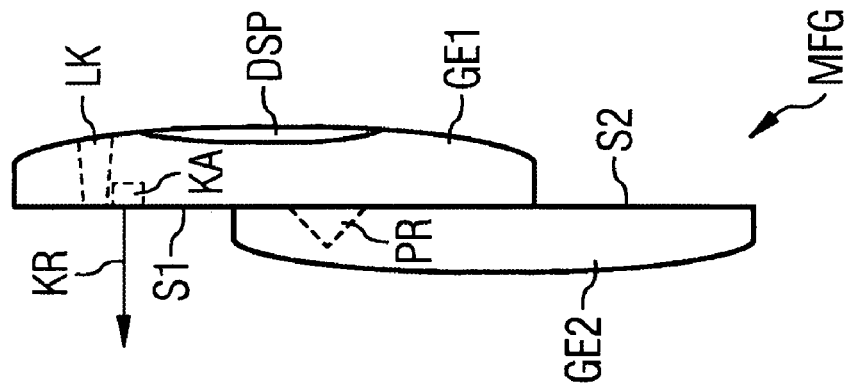

PORTABLE ELECTRONIC APPLIANCE WITH A CAMERA AND AN OPTICAL DEFLECTION DEVICE

CROSS REFERENCE TO RELATED APPLICATIONS

This application is based on and hereby claims priority to PCT Application No. PCT/EP2006/060490 filed on Mar. 6, 2006 and German Application No. 10 2005 010 920.9 filed on Mar. 9, 2005, the contents of which are hereby incorporated by reference.

BACKGROUND

The present invention relates to a portable electronic appliance, in particular embodied as a mobile communication appliance, which is equipped with a camera for acquiring images.

Today's portable electronic appliances, such as mobile telephones for example, allow a plurality of applications. In particular they are able to capture images of their user or surroundings. For a high level of user-friendliness, it is often necessary to equip the portable electronic appliances with two cameras. One points away from the user or behind and is used to record images of the surroundings. A second camera points forward or toward the user and is ultimately required to capture images of the user themselves, for example for telephone conferences.

A further user-friendly option with a portable electronic appliance for recording images both of a user and of the (user's) surroundings is implemented in more recent mobile telephones, which only have one camera, which is however attached to the mobile telephone by a complex swivel mechanism, which allows the camera to swivel about one or more axes.

Both options described above for the structure of a portable electronic appliance allow the user to record images in a very user-friendly manner but are expensive.

SUMMARY

One possible object is therefore to create an economical portable electronic appliance, which allows the recording of images in a very user-friendly manner.

The inventors propose a portable electronic appliance having a first housing element with a first side and a second housing element with a second side. A linking device is also provided to link the two housing elements, specifically in such a manner that the two housing elements can be moved in relation to each other, with the first side facing the second side at least in a first state or movement state. A camera for acquiring images is disposed on the first side of the first housing element in such a manner that it is oriented away from the first housing element. This means that the acquisition direction of the camera points away from the first side or the first housing element. An optical deflection device is disposed on the second side of the second housing element in such a manner that it reflects back light striking the second side. The optical deflection device can thereby comprise reflection elements, such as a mirror or prism, in particular with mirror-plated legs. The optical deflection device can also comprise an optical waveguide, which is also able to reflect back light transmitted in the direction of the second side. The portable electronic appliance is designed so that in the first movement state of the housing elements the camera is located opposite the optical deflection device, in order to receive light by way of the optical deflection device. The arrangement of the camera opposite the optical deflection device in the first movement state means for example that the camera or camera lens is protected from dust and scratches when acquiring images. Also provision of the camera in a movable housing element means that it is easy for the user to change the acquisition direction, so there is no need for an additional expensive or complex mechanical mechanism for swiveling the camera, in order to rotate or swivel said camera.

The portable electronic appliance can also have a second movement state of the housing elements in relation to each other, wherein the camera receives light without deflection by the optical deflection device. This means that while in the first movement state an image of an object located counter to the image acquisition direction of the camera is acquired, in the second movement state an image can be acquired, which is located in the image acquisition direction of the camera. It is thus possible to define the direction in which images are acquired as a function of the position of the housing elements in relation to each other. This means on the one hand that there is no need to provide a second camera for user-friendly operation, thereby also allowing costs to be saved for the second camera. Also the user does not have to switch specifically between two cameras when acquiring images, since a suitable state or suitable image acquisition direction of the camera is selected automatically by setting a spatial arrangement of the housing sections in relation to each other, in other words by selecting a movement state. An economy of space is also achieved by dispensing with the need for a second camera. With higher quality appliances with multiple equipment options it is generally problematic keeping the volume requirement small enough to achieve an attractive design. It is therefore possible to reduce this problem with the structure of a portable electronic appliance according to the description.

According to an advantageous refinement the linking device links the two housing elements to each other in such a manner that the first and second sides remain oriented parallel to each other during movement of the two housing elements. This means that the movement of the two housing elements or the first and second sides takes place respectively in a movement plane or parallel to this plane. In this respect the linking device can have a slider mechanism, by which the two housing elements are displaced in relation to each other along a displacement plane, while the first and second sides of the two housing elements, which face each other, move parallel to each other. It is also possible for the linking device to have a rotation mechanism, by which the two housing elements can be rotated in relation to each other, with the first and second sides of the two housing elements, which face each other, moving parallel to each other during the rotation.

According to a further advantageous refinement of the portable electronic appliance the first housing element also has a light channel to allow the passage of light. This light channel serves, in particular in the first movement state, wherein the camera is disposed opposite the optical deflection device, to allow the passage of light to the optical deflection device, it being possible for the camera then to acquire said light. It is thus possible not only to provide the camera on the edge of the first housing element, where light can strike the optical deflection device directly even without a light channel, to be directed on to the camera, but the provision of the light channel means that the camera and respectively the optical deflection device can be provided at any points on the housing element(s). This increases the degree of freedom in respect of appliance design.

According to an advantageous refinement the portable electronic appliance is configured as a mobile communication terminal, such as a mobile radio appliance or a mobile telephone. It is also possible for the portable electronic appliance to be configured as a portable computer, such as a PDA (personal digital assistant) or organizer.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 shows a schematic side view of the portable electronic appliance in FIG. 1 in a second or open state;

FIG. 5 shows a schematic front view of the mobile telephone in FIG. 4;

FIG. 6 shows a schematic rear view of the mobile telephone in FIG. 4.

DETAILED DESCRIPTION OF THE PREFERRED EMBODIMENT

Figure 1:
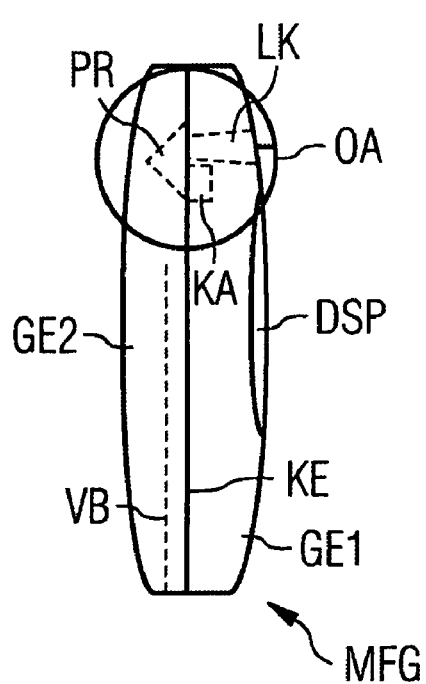
FIG. 1 shows a schematic side view of a portable electronic appliance embodied as a mobile telephone in a first or closed state according to a one potential embodiment of the invention.
Figure 2:
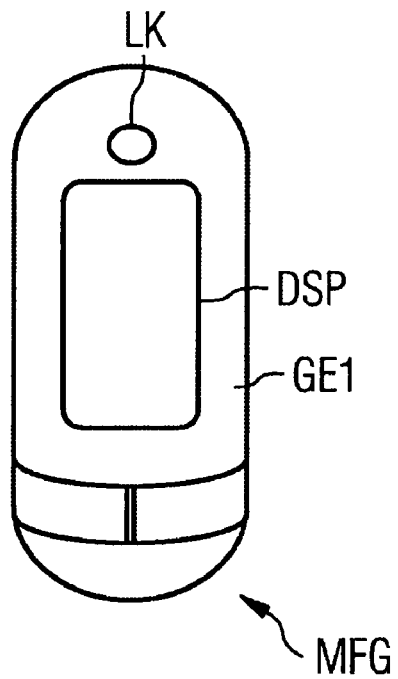
FIG. 2 shows a schematic front view of the mobile telephone in FIG. 1.

Reference will now be made in detail to the preferred embodiments of the present invention, examples of which are illustrated in the accompanying drawings, wherein like reference numerals refer to like elements throughout.

A portable electronic appliance is described below embodied by way of example as a mobile telephone MFG according to a preferred embodiment.

To this end reference is first made to FIG. 1, which shows a schematic side view of the mobile telephone MFG in a first or closed state. The mobile telephone MFG here has a first housing element GE1 and a second housing element GE2, which are linked to each other by way of a linking mechanism VB. The linking mechanism VB in the present instance is configured as a slider mechanism, indicated by the broken line to the left of the interface (plane KE) of the housing elements GE1 and GE2. Two rail elements engaging in each other in the respective housing elements GE1, GE2 mean that the slider mechanism allows the housing elements GE1, GE2 to move in relation to each other. The movement takes place in a plane KE, which is defined by the contact surfaces of the respective housing elements. More precisely the movement of the housing elements takes place in such a manner that a first side or surface S1 (see also FIG. 4) of the first housing element GE1 and a second side or surface S2 (see also FIG. 4) of the second housing element GE2 move parallel to each other or to the plane KE during the movement.

As also shown in FIG. 1, the first housing element GE1 has an electronic camera KA with a sensor, for example a CDD (charge-coupled device) or CMOS (complementary metal-oxide semiconductor) sensor for acquiring images. It can be seen from FIG. 4, which shows the mobile telephone MFG from FIG. 1 in a second open state, that the camera KA is disposed on the first side S1 in such a manner that the orientation KR of the camera KA for image acquisition points away from the first side S1, pointing away in a perpendicular manner in the present instance. The first housing element GE1 also comprises a light channel LK to allow the passage of light. The light channel LK may simply have a through recess or in an advantageous refinement it may have optically transparent sealing elements for example at the channel ends, so that no dust or moisture penetrates into the channel. The second housing element GE2 comprises an optical deflection device PR, configured here in the embodiment of a prism. The camera KA, the light channel LK and the optical deflection device PR can hereby be referred to as the optical segment OA of the mobile telephone MFG.

Figure 3:
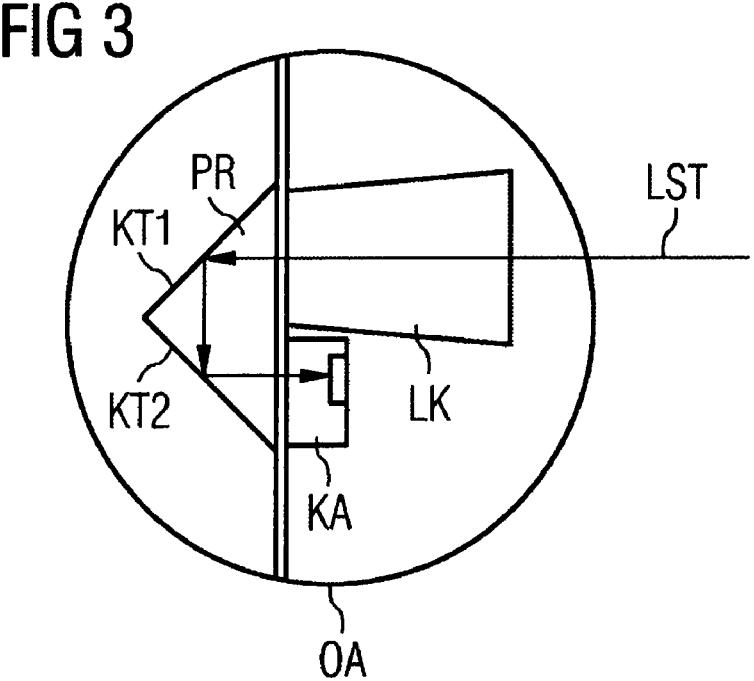
FIG. 3 shows a detailed view of an optical segment of the mobile telephone according to FIGS. 1 and 2.

This optical segment OA is shown in detail in FIG. 3 for greater clarity. As can be seen from FIG. 3, the optical deflection device comprises a prism PR, whose legs KT1 and KT2 are mirror-plated. A light beam LST (representing an image of an object), which is transmitted from outside onto the first housing element GE1 in the direction of the second housing element GE2, passes first through the light channel LK and then strikes the prism PR, being reflected (twice) off the latter's mirror-plated legs, finally being deflected in the direction of the camera KA to the latter's sensor. This state, wherein the camera KA is disposed opposite the optical deflection device or the prism PR, so that light does not strike the camera directly but after reflection at the optical deflection device, is referred to as the first or closed state of the mobile telephone MFG.

Let us now look at FIG. 1, which also shows that the mobile telephone MFG has a display device DSP, for example embodied as an LCD (liquid crystal display). The display device DSP can serve here for example to display images just acquired by the camera KA as well as images stored in the mobile telephone MFG.

FIG. 3 shows a front view of the mobile telephone MFG shown in FIG. 1 in the closed state. Light, which passes through the light channel LK in this state, is deflected by way of the prism PR (see FIG. 1) to the camera and acquired there. This means that in the closed state images are captured of objects facing the front of the mobile telephone MFG. For example a user of the mobile telephone MFG in the closed state can take an image of themselves, which can then be displayed in the display device DSP. The display device can in particular serve as a search facility here.

Let us now look at FIGS. 4 to 6, which show a second or open state of the mobile telephone MFG from FIGS. 1 and 3. It is characteristic of the open state that the housing elements GE1 and GE2 are displaced in relation to each other compared with the closed state, so that the camera KA is moved away from the optical deflection device PR and therefore no longer interacts optically with this. Since, as shown in FIG. 4, the camera KA is now exposed and no longer covered by the second side S2, light can strike the camera directly and images can be acquired directly by the camera KA.

In particular when using a slider mechanism, which does not permit such extensive movement of the housing elements GE1 and GE2 in relation to each other, it is also possible according to an advantageous refinement for the second housing element GE2 to have a second light channel (not shown) for example above the optical deflection device PR, through which light channel light (from an object from the rear of the mobile telephone) can be directed directly onto the camera KA.

It can therefore be observed that in the second or open state the camera KA can be used to acquire light or an image of an object, which is located behind the mobile telephone MFG, in other words on the side facing the second housing element GE2.

It is also possible therefore to switch to and fro between a closed and open state simply by displacing the housing elements GE1 and GE2 in relation to each other, it also being possible to change the recording direction or acquisition direction for acquiring images by the camera KA in a user-friendly manner by moving the housing elements. A number of advantages therefore result with the mobile telephone according to the preferred embodiment. Switching between the open and closed states, as shown in the respective front views in FIGS. 3 and 5, represents a change in the operating state of the mobile telephone, it being possible to operate the mobile telephone in a user-friendly manner by the keypad TAS (FIG. 5) in the open state, while in the closed state the mobile telephone has a small or compact form. This means that as well as changing the operating state for operating the mobile telephone, switching between the open and closed states also makes it possible to change the image acquisition direction of the camera (without an additional mechanism). When changing acquisition direction it only has to be taken into account into account that an image acquired by way of the optical deflection device PR requires further rotation compared with a directly acquired image. This can be ensured by soft ware however.

In addition to the structure of a mobile telephone MFG as shown in FIGS. 1 to 6, wherein the camera KA and light channel LK are provided in a first housing element GE1, and the optical deflection device PR is provided in the second housing element GE2, these optical components can also be provided in the respective other housing element. The resulting advantages are described below.

If the camera and light channel are located in the second housing element and the optical deflection device in the first housing element, in the closed state it is now possible to acquire images of objects (or surroundings) located behind the mobile telephone, in other words on the side facing the second housing element. For certain applications this does not represent a restriction, as it is hereby assumed that when acquiring their surroundings the user does not require the appliance keypad (which is accessible in the open state). Images of surroundings are generally mostly acquired "offline" and the user will also generally not dial a telephone number in this process or adjust any settings. In contrast in the open state images of objects in front of the mobile telephone are acquired, since these objects, like the face of the user, are directly in the acquisition direction of the camera. The user is thus able to make inputs and acquire images of themselves at the same time, for example for telephone conferences.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A portable electronic appliance, comprising:
    a first housing element with an outer side and an opposing inner first side, the first housing element having a light channel to allow light to pass between the outer side and the inner first side;
    a second housing element with a second side;
    a linking device to link the first and second housing elements in such a manner that the first and second housing elements can be moved in relation to each other between a first movement state and a second movement state, with the first side facing the second side in the first movement state, the linking device maintaining the first and second sides in a parallel orientation during movement of the first and second housing elements;
    a camera for acquiring images, which is disposed on the first side in such a manner that it is oriented to face away from the first housing element;
    an optical deflection device, which is disposed on the second side in such a manner that it reflects back light striking the second side, the camera and the light channel being located opposite the optical deflection device in the first movement state so that in the first movement state, the camera receives light from the outer side of the first housing element via passage through the light channel and via deflection by the optical deflection device, the optical deflection device being selected from the group consisting of a mirror, a prism with mirror-plated legs and an optical waveguide; and
    electronic elements provided in at least one of the first and second housing elements, the electronic elements being selected from the group consisting of a mobile radio appliance, a mobile telephone and a portable computer, wherein
    in the second movement state, the camera receives light without deflection by the optical deflection device.

2. A portable electronic appliance, comprising:
    a first housing element with a first side and a second housing element with a second side;
    a linking device to link the first and second housing elements in such a manner that the first and second housing elements can be moved in relation to each other, with the first side facing the second side at least in a first movement state;
    a camera for acquiring images, which is disposed on the first side in such a manner that it is oriented to face away from the first housing element; and
    an optical deflection device, which is disposed on the second side in such a manner that it reflects back light striking the second side, the camera being located opposite the optical deflection device in the first movement state, to receive light in the first movement state by way of deflection from the optical deflection device.

3. The portable electronic appliance as claimed in claim 2, wherein
    the first and second housing elements move in relation to each other between the first movement state and a second movement state, and
    in the second movement state, the camera receives light without deflection by the optical deflection device.

4. The portable electronic appliance as claimed in claim 2, wherein the linking device links the first and second housing elements to each other in such a manner that the first and second sides remain oriented parallel to each other during movement of the first and second housing elements.

5. The portable electronic appliance as claimed in claim 2, wherein
    the linking device has a slider mechanism, and
    the slider mechanism enables the first and second housing elements to slide with respect to each other along a displacement plane.

6. The portable electronic appliance as claimed in claim 2, wherein
    the linking device has a rotation mechanism, and
    the rotation mechanism enables the first and second housing elements to rotate with respect to each other.

7. The portable electronic appliance as claimed in claim 2, wherein the optical deflection device is selected from the group consisting of a mirror, a prism with mirror-plated legs and an optical waveguide.

8. The portable electronic appliance as claimed in claim 2, wherein the first housing element has a light channel to allow passage of light therethrough.

9. The portable electronic appliance as claimed in claim 2, further comprising electronic elements provided in at least one of the first and second housing elements, the electronic elements being selected from the group consisting of a mobile radio appliance, a mobile telephone and a portable computer.

10. The portable electronic appliance as claimed in claim 3, wherein the linking device links the first and second housing elements to each other in such a manner that the first and second sides remain oriented parallel to each other during movement of the first and second housing elements.

11. The portable electronic appliance as claimed in claim 10, wherein
   the linking device has a slider mechanism, and
   the slider mechanism enables the first and second housing elements to slide with respect to each other along a displacement plane.

12. The portable electronic appliance as claimed in claim 10, wherein
   the linking device has a rotation mechanism, and
   the rotation mechanism enables the first and second housing elements to rotate with respect to each other.

13. The portable electronic appliance as claimed in claim 12, wherein the optical deflection device is selected from the group consisting of a mirror, a prism with mirror-plated legs and an optical waveguide.

14. The portable electronic appliance as claimed in claim 12, wherein the first housing element has a light channel to allow passage of light therethrough.

15. The portable electronic appliance as claimed in claim 14, further comprising electronic elements provided in at least one of the first and second housing elements, the electronic elements being selected from the group consisting of a mobile radio appliance, a mobile telephone and a portable computer.

* * * * *